United States Patent
Yang et al.

(10) Patent No.: US 7,295,842 B2
(45) Date of Patent: Nov. 13, 2007

(54) HANDOVER METHOD IN MOBILE COMMUNICATION SYSTEM

(75) Inventors: Guiliang Yang, Beijing (CN); Chenguang Li, Beijing (CN); Feng Li, Beijing (CN); Jinling Hu, Beijing (CN); Darun Wang, Beijing (CN)

(73) Assignee: Da Tang Mobile Communications Equipment Co., Ltd., Beijing (CN)

( * ) Notice: Subject to any disclaimer, the term of this patent is extended or adjusted under 35 U.S.C. 154(b) by 158 days.

(21) Appl. No.: 11/149,095

(22) Filed: Jun. 9, 2005

(65) Prior Publication Data

US 2005/0272426 A1    Dec. 8, 2005

Related U.S. Application Data

(63) Continuation of application No. PCT/CN03/01058, filed on Dec. 12, 2003.

(30) Foreign Application Priority Data

Dec. 13, 2002    (CN)    ................ 02 1 55650

(51) Int. Cl.
*H04Q 7/20*    (2006.01)
(52) U.S. Cl. .................................... 455/436
(58) Field of Classification Search ................ 455/440, 455/441, 404.2, 456.1, 445, 464, 456.2, 9, 455/238.1, 411.1, 457, 436, 442, 437, 502, 455/67.6, 67.1, 403, 439, 444, 438, 458.1; 370/328–329, 339, 341–342, 294–295, 331–332, 370/281
See application file for complete search history.

(56) References Cited

U.S. PATENT DOCUMENTS 6,584,116 B1    6/2003   Gourgue et al. ............ 370/442
6,611,507 B1    8/2003   Teittinen et al. ............ 370/331
6,708,041 B1*   3/2004   Butovitsch et al. ......... 455/522
6,859,655 B2*   2/2005   Struhsaker .................. 455/450

(Continued)

FOREIGN PATENT DOCUMENTS

CN    1254246    5/2000

(Continued)

*Primary Examiner*—Naghmeh Mehrpour
(74) *Attorney, Agent, or Firm*—Marshall, Gerstein & Borun LLP

(57) ABSTRACT

A handover method in a mobile communication system, wherein, while maintaining communication with a certain base station before handover, a mobile terminal measures signals of adjacent cells and confirms the candidate handover target base stations; the mobile terminal sends measurement report to network; inserting the procedure of pre-synchronization between the mobile terminal and the handover target base station, including: while sending measurement report to the network, the mobile terminal sends training sequence to the handover target base station; after receiving the training sequence, the handover target base station sends training sequence response message to the mobile terminal; the mobile terminal maintains open-loop or closed-loop synchronization with the handover target base station; the network sends handover command to the mobile terminal; the mobile terminal directly switches to the handover target base station according the handover command; wireless link between the mobile terminal and the handover-forward base station is released. By pre-acting wireless link synchronization establishment in handover before measuring stage, handover process time is reduced, system sources are saved, and handover reliability and quality are improved as well.

11 Claims, 3 Drawing Sheets

U.S. PATENT DOCUMENTS

| | | |
|---|---|---|
| 6,892,071 B2 | 5/2005 | Park et al. ................... 455/436 |
| 6,993,337 B2 * | 1/2006 | Rudrapatna et al. ......... 455/440 |
| 7,116,647 B2 * | 10/2006 | Uebayashi et al. .......... 370/329 |
| 2002/0004396 A1 | 1/2002 | Shibasaki .................... 455/436 |
| 2002/0045451 A1 | 4/2002 | Hwang et al. ............... 455/442 |

FOREIGN PATENT DOCUMENTS

| | | |
|---|---|---|
| CN | 1332542 | 1/2002 |
| CN | 1337800 | 2/2002 |
| CN | 1349358 | 5/2002 |
| CN | 1373976 | 10/2002 |

* cited by examiner

HANDOVER METHOD IN MOBILE COMMUNICATION SYSTEM

CROSS-REFERENCE TO RELATED APPLICATION

This is a continuation of International Application No. PCT/CN2003/001058 filed Dec. 12, 2003, the entire disclosure of which is hereby incorporated herein by reference.

BACKGROUND OF THE INVENTION

1. Field of the Invention

The invention relates to mobile communication technology, more particularly to the handover method of mobile communication, applicable for designing open-loop or closed-loop synchronization technology for digital mobile communication systems.

2. Related Technology

To guarantee continuity of communication service when a mobile terminal is moving or the location of the mobile terminal is changing, all wireless communication systems adopt handover technology, which includes soft-handover, hard-handover, and handover baton handover, etc.

FIG. 1 briefly illustrates flow of the current handover modes. (1) Assuming that a wireless link service connection is already established between a mobile terminal and a base station 1, and communication is maintained; (2) the mobile terminal measures the wireless signal from an adjacent cell, mainly measuring power, distance; and voice quality since these three values determine the handover threshold, then compares the handover threshold thereof with a handover decision criterion established in the mobile terminal; if the handover threshold thereof exceeds the decision threshold, the mobile terminal reports the measurement report containing a handover request and measuring results to the network; the network integrates the reported power, distance and voice quality, and calculates a handover threshold, then compares this handover threshold with the handover decision threshold stored in the network, performing the handover decision and determining whether to switch; (3) when deciding to perform handover, the network a sends handover command to the mobile terminal and switches the mobile terminal to a base station 2 with a prepared wireless link; (4) wireless link synchronization is established between the mobile terminal and a target base station 2; (5) wireless link service connection is established between the mobile terminal and the handover target base station 2; and (6) after the mobile terminal transmits confirmative information of handover success, the wireless link between the mobile terminal and the base station 1 is released.

In most CDMA systems, soft-handover or hard-handover is adopted, whose characteristics are: before handover, besides maintaining communication with the handover-forward base station (i.e. base station 1), the mobile terminal has to measure signals of adjacent cells; during the handover procedure, there is a synchronization-establishing procedure between the mobile terminal and the target base station (i.e. base station 2).

For the existing handover of mobile communication systems, when the base stations are already synchronous or synchronization variation is known and constant, the uplink synchronization time can be precisely calculated according to the measured values of base station downlink signals measured by the mobile terminal. If synchronization is not implemented among the base stations, in most cases, wireless link synchronization between the mobile terminal and the target base station will not be established until not only the to-be-switched-to target base station is determined but also the network decides to perform handover, so the synchronization procedure occupies the time of handover. When the mobile terminal is in a fast-moving state or a continuous location-changing state, excessive handover time occupation will inevitably adversely affect the handover success rate and reliability thereof, and decrease handover quality.

GENERAL DESCRIPTION OF THE INVENTION

The invention provides a handover method in mobile communication system, in order to greatly decrease the occupied time during handover procedure, and to increase handover reliability, success rate, and handover quality. By applying the pre-synchronization technology in handover, handover performance of the system can be improved.

The technical scheme of the present invention is implemented by the following steps:

A. before handover, measuring signals of adjacent cells by a mobile terminal while maintaining communication between a certain handover-forward base station and the mobile terminal, and confirming candidate handover target base stations to be switched to by the mobile terminal;

B. sending a measurement report of the handover target base stations satisfying a handover decision criterion to network by the mobile terminal;

C. sending a handover command to the mobile terminal by the network when the network determines to perform handover according to the handover decision criterion;

D. directly carrying out handover to the handover target base station according to the handover command by the mobile terminal; and E. releasing the communication (e.g., wireless) link between the mobile terminal and the handover-forward base station.

Between Step B and Step C, a pre-synchronization procedure between the mobile terminal and the handover target base station is carried out, where this procedure, comprises sending a training sequence to the handover target base station by the mobile terminal while the mobile terminal sends the measurement report to the network; after the handover target base station receives the training sequence, returning a training sequence response message to the mobile terminal by the handover target base station; and maintaining open-loop or closed-loop uplink synchronization between the mobile terminal and the handover target base station.

In a preferred embodiment, in step A, the mobile terminal performs the measurement by receiving and detecting a downlink pilot timeslot of adjacent cells, maintaining the downlink signal synchronization with each candidate handover target base station, and establishing downlink synchronization with each candidate handover target base station in open-loop mode.

In another preferred embodiment, the training sequence response message is directly sent to the mobile terminal in signaling mode by the handover target base station.

In another embodiment, the training sequence response message is sent to the network in signaling mode by the handover target base station first, and then sent to the handover-forward base station in signaling mode by the network, and finally sent to the mobile terminal in signaling mode by the handover-forward base station.

In some areas, the training sequence response message may include synchronization information and power adjustment information.

The pre-synchronization procedure between the mobile terminal and the handover target base station may further include the steps of:

sending uplink pilot code to the handover target base station during an uplink pilot a time slot by the mobile terminal with the training sequence and adopting estimated transmission timer and transmission power, and establishing uplink synchronization with the handover target base station in open-loop mode by the mobile terminal; and sending the command of timing adjustment and/or power adjustment concerning the mobile terminal to the mobile terminal by the handover target base station using the training sequence response message and according to the received uplink pilot code, amending the timing and/or transmission power concerning the handover target base station according to the command by the mobile terminal, and then establishing uplink synchronization with the handover target base station in closed-loop mode by the mobile terminal.

The inventive method may further include the steps of:

The mobile terminal recording the starting time $t_{d0}$ of downlink pilot time slot of the handover target base station and the starting time $t_{u0}$ of the mobile terminal's own uplink pilot time slot when establishing synchronization; the mobile terminal repeatedly executing Steps A and B, above, according to the received change of starting time $t_{d0}$ of downlink pilot time slot of the handover target base station, the mobile terminal determining the change of starting time $t_{u0}$ of the mobile terminal's uplink pilot time slot, until the mobile terminal receiving handover command, $t_d=t_{d0}+N \times T+\Delta$, $t_u=t_{u0}+N \times T-2\Delta$, wherein N is the passed sub-frame number, T is length of each sub-frame, and $\Delta$ is the needed compensatory time variation, namely the variation when less than T.

In another embodiment of the inventive method, in Step E, the release information of the communication (wireless) link between the mobile terminal and the handover-forward base station is directly sent to the handover-forward base station by the mobile terminal.

In yet another embodiment, in Step E, the release information of the communication (wireless) link between the mobile terminal and the handover-forward base station is sent to the network by the handover target base station first, and then sent to the handover-forward base station by the network.

As to the inventive method, while a mobile terminal is sending a measurement report to the, by sending a special training sequence to a target base station and according to the returned adjustment information, the mobile terminal completes handover preparation and establishing the synchronization process, then maintains this synchronization by adopting an open-loop or closed-loop mode. When the network sends out handover command, the mobile terminal can be directly switched to the allocated target base station without reestablishing access and synchronization.

As to time division duplex TD-SCDMA (Time Division Synchronous Code Division Multiple Access) system, for this open-loop or closed-loop synchronization, uplink timing adjustment needed for implanting synchronization is precisely acquired by measuring timing changes of the downlink pilot time slot of target base station, and this is completed simply and accurately.

In the inventive method, the establishment of wireless link synchronization during handover may be instituted during a measuring period, so handover procedure time is reduced, handover required system sources are saved, and handover reliability and handover quality of communication service are advanced. In addition, through the network's returning response of training sequence to mobile terminal, and by adopting the mode of network releasing link of original communication base station, requirement of mobile terminal design is simplified, namely all signaling information before handover is transferred through the handover-forward base station, all signaling information after handover is transferred through the handover target base station, without requesting mobile terminal to maintain signaling connection with the base station before handover and the one afterward simultaneously.

DETAILED DESCRIPTION OF PREFERRED EMBODIMENTS

The invention will be described in detail hereinafter with reference to the accompanying drawings.

Figure 1:
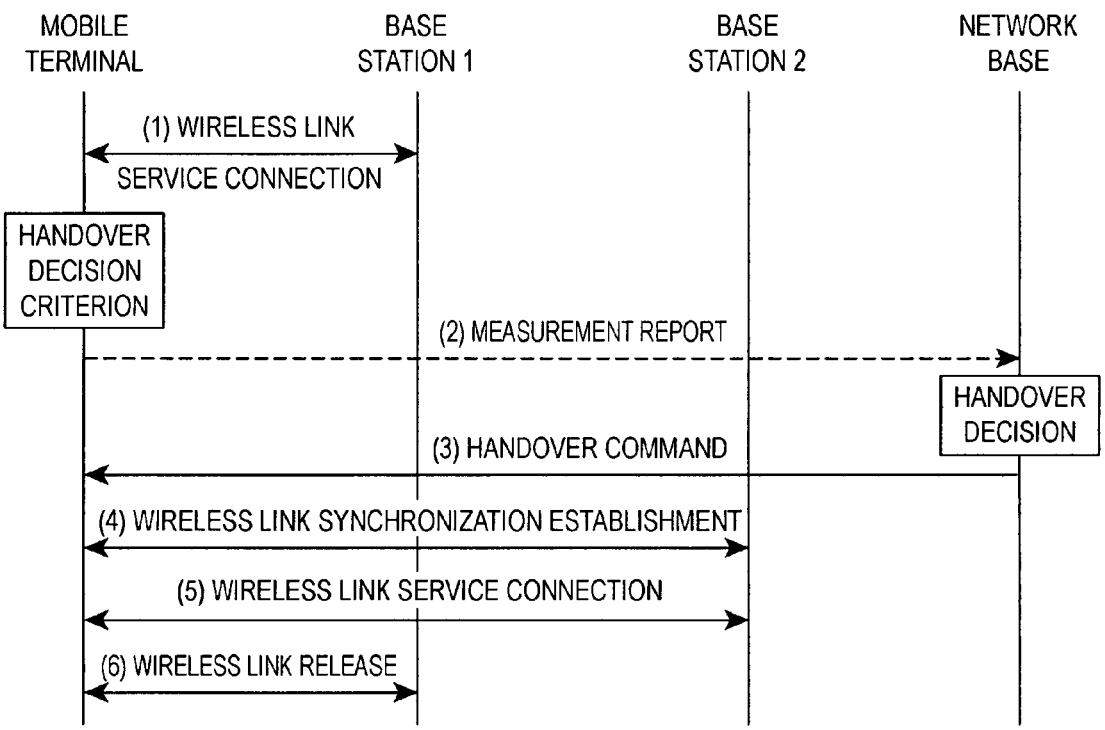
FIG. 1 is a flowchart illustrating the handover process of existing technology.
Figure 2:
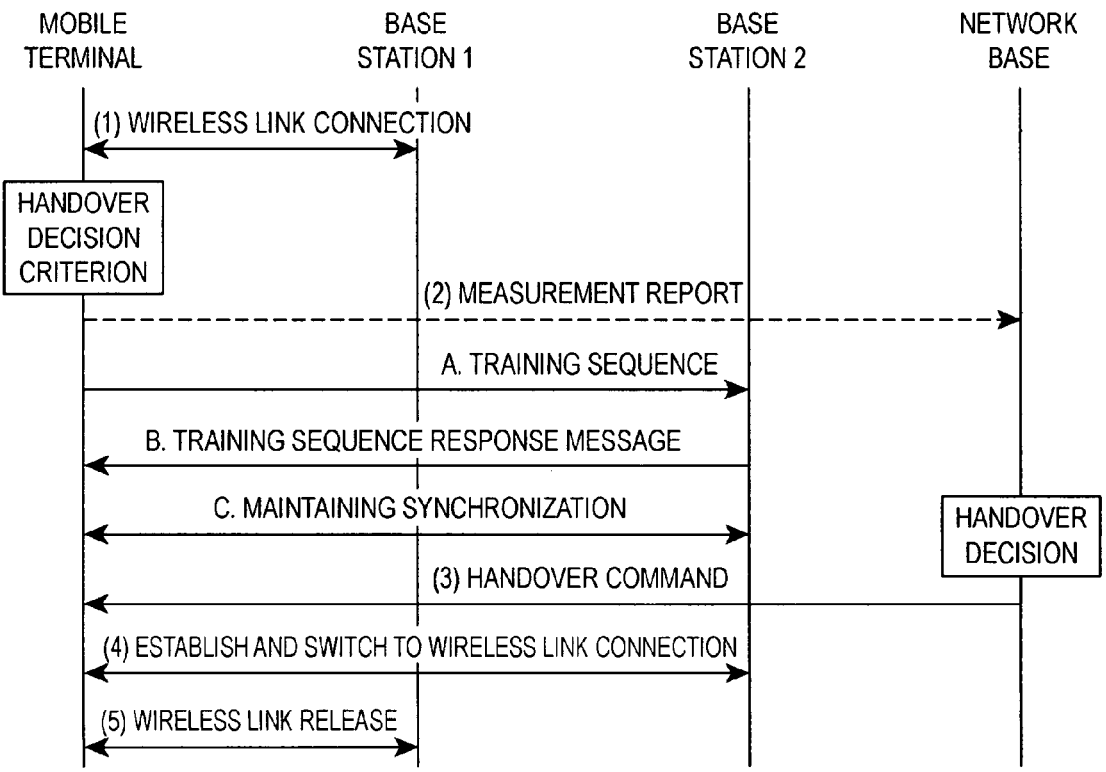
FIG. 2 is a flowchart illustrating the handover process of the invention.

With reference to FIG. 2, a simplified handover process of the present invention is illustrated.

(1) While maintaining communication with the handover-forward base station (base station 1), a mobile terminal needs to measure signals of an adjacent cell and, according to the measured results, the mobile terminal will choose several base stations as handover candidate target base stations. During this period, other than maintaining normal communication with handover-forward base station (the base station 1), the mobile terminal also needs to measure necessary parameters of the handover candidate target base stations, including power, and distance, and real-timely updates the candidate target collection.

(2) When the mobile terminal detects that the measured results of a certain candidate target base station meet certain handover requirement(s) according to a handover decision criterion, the mobile terminal will report the results as a measurement report to network and real-timely refresh the measured results.

(a) Meanwhile, according to the measured results, the mobile terminal sends a training sequence (i.e. preamble training sequence) to a target base station (the base station 2), and then waits for a training sequence response message from the base station 2 (synchronization and power adjustment information can be included in training sequence response message for transmission);

(b) The training sequence response message can be transmitted to the mobile terminal by the handover target base station (the base station 2) in signaling mode;

(c) Afterwards, while maintaining wireless link connection with handover-forward base station (the base station 1), the mobile terminal also maintains open-loop or closed-loop uplink synchronization with the handover target base station (the base station 2) according to measured results of the handover target base station (the base station 2).

(3) When determining to perform handover according to the handover decision criterion, the network will send handover command to the mobile terminal.

(4) The mobile terminal directly switches to the link resource allocated by the handover target base station (the base station 2) according to handover command, and continues communication.

(5) The mobile terminal releases the wireless link with handover-forward base station (the base station 1).

Figure 3:
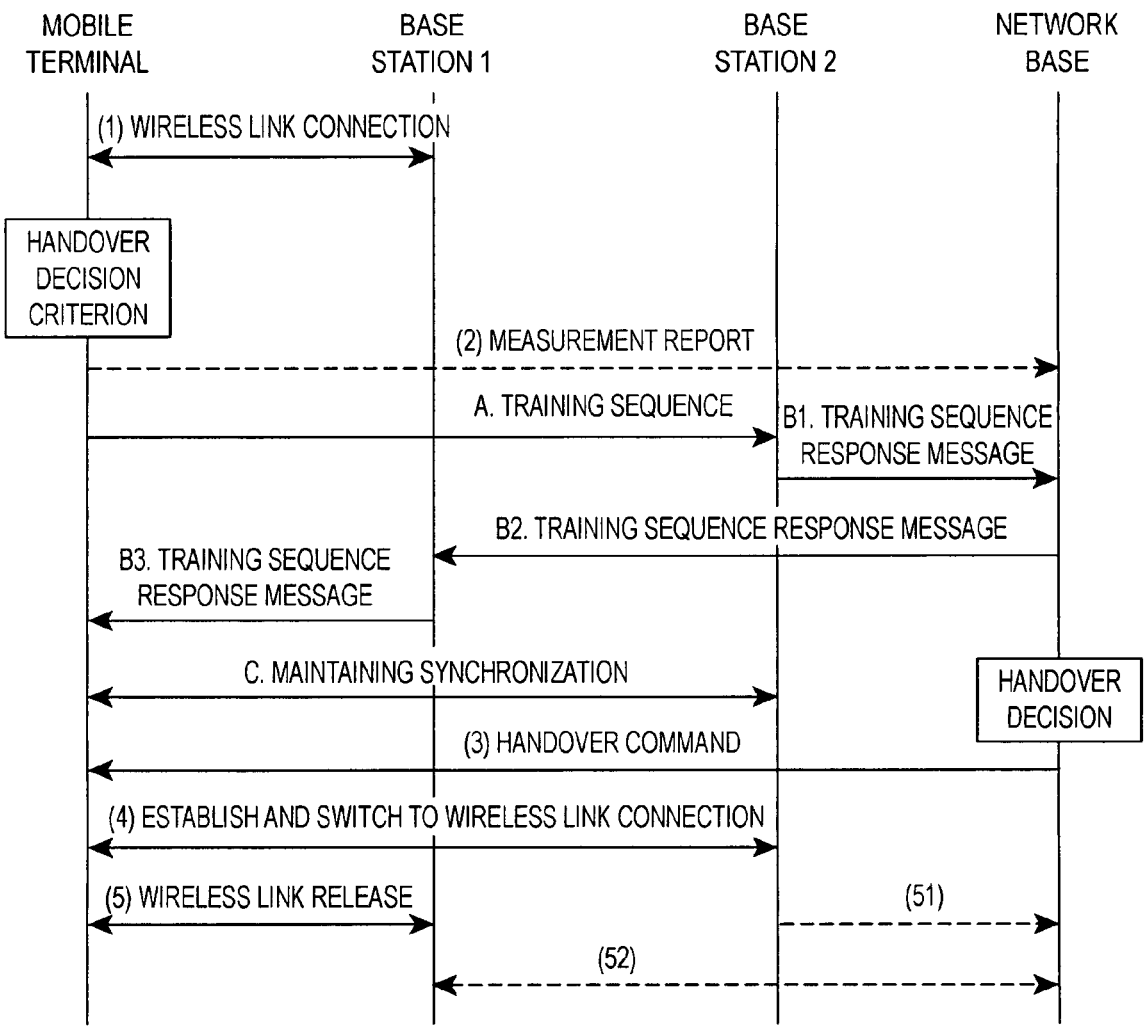
FIG. 3 is another flowchart illustrating the handover process of the invention.

The illustration difference between FIGS. 2 and 3 is the arriving procedure of the training sequence response message to the mobile terminal, namely the training sequence response message can also be returned to the mobile terminal through the following steps:

(b1) firstly, the handover target base station (the base station 2) sends a training sequence response message to the network in signaling mode; (b2) then the network sends the training sequence response message to the handover-forward base station (the base station 1); (b3) finally, the handover-forward base station (the base station 1) sends the training sequence response message to the mobile terminal. In other words, the network notifies the mobile terminal in signaling mode through the handover-forward base station (the base station 1). The advantage of this mode is: after finishing sending a training sequence by the mobile terminal, there is no need for mobile terminal to wait the training sequence response message, so as to maintain communication with the handover-forward base station (the base station 1); through the network's returning the training sequence response to the mobile terminal, the design requirement of the mobile terminal can be simplified.

Besides, after the mobile terminal establishes and switches to wireless link with the the handover target base station (the base station 2) (4), the link release information (5) concerning the mobile terminal and the handover-forward base station (the base station 1) can first be sent to the network by the handover target base station (the base station 2), and then sent to the base station 1 by the network, as is shown by arrow 51 and 52 in FIG. 5. By the way of releasing the handover-forward base station's link through the network, design requirements of the mobile terminal can be simplified, namely all response information before handover being transferred through the handover-forward base station (from the base station 2 to the network, then to the base station 1, then to the mobile terminal), and all release information 51 and 52 being transferred through the handover target base station (from the base station 2 to the network and then to the base station 1).

Hereinafter, taking TD-SCDMA system for example, open-loop or closed-loop synchronization technology of the invention will be described.

Figure 4:
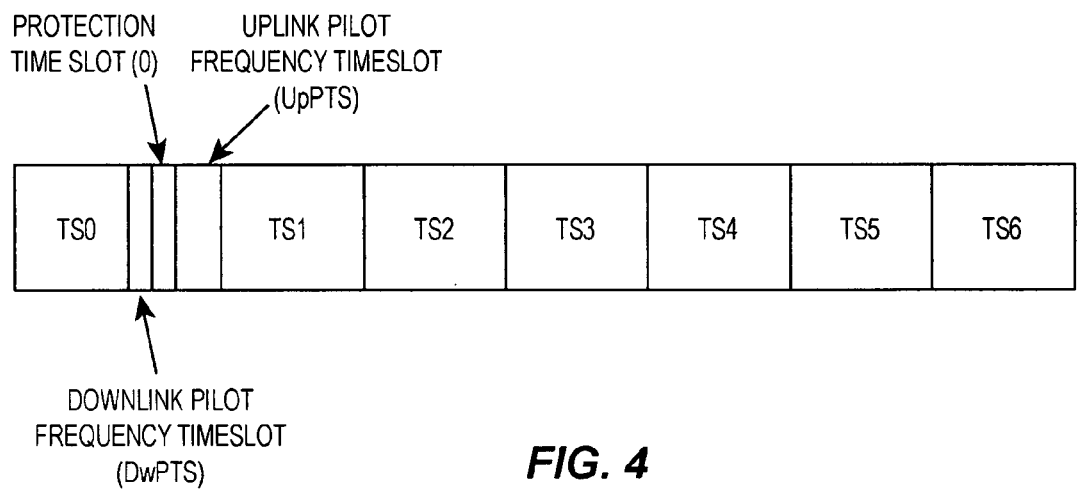
FIG. 4 is a diagram illustrating frame structure of a TD-SCDMA system.

With reference to FIG. 4, a frame structure of a TD-SCDMA system is shown. In the frame structure, a downlink pilot time slot (DwPTS) is set for providing the system's downlink synchronization, and an uplink pilot time slot (UpPTS) is set for implementing uplink synchronization performance. A protection time slot G is set between the downlink pilot time slot (DwPTS) and uplink pilot time slot (UpPTS). In terms of this frame structure, pre-synchronization of TD-SCDMA system can be implemented as follows:

during the period of the mobile terminal being connected with the handover-forward base station, the mobile terminal continuously measures signals of adjacent cells, and confirms the possible candidate handover target base stations according to the measured results;

by receiving and detecting downlink pilot timeslot of each candidate target base station, the mobile terminal finishes measuring and maintains downlink signal synchronization with this candidate target base station, and establishes open-loop downlink synchronization during this period; and according to the measured results, by adopting estimated transmission timing and transmission power and by using training sequence, the mobile terminal transmits uplink pilot frequency code to the handover target base station in uplink pilot timeslot, and starts establishing uplink synchronization in open-loop mode.

According to the received uplink pilot frequency code, the candidate target base station sends out power adjustment and/or timer adjustment command for the mobile terminal by using training sequence response, then the mobile terminal amends the transmission timing and/or transmission power for the candidate target base station and finishes establishing uplink synchronization in closed-loop mode.

Figure 5A:
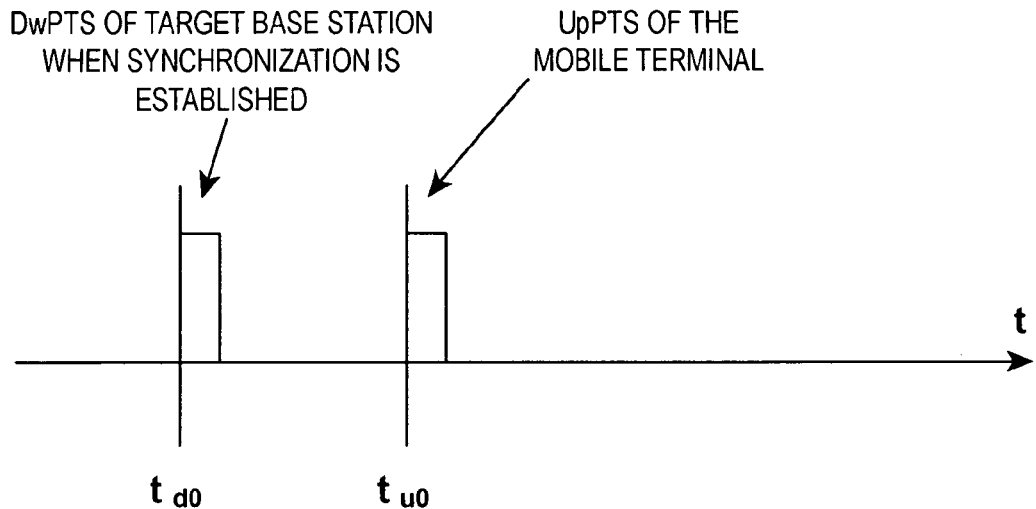
FIG. 5A illustrates time-axis distribution diagram of both starting time of a target base station's downlink pilot time slot and starting time of mobile terminal's up link pilot time slot when synchronization is being established in a TD-SCDMA system, for example; and, FIG. 5B illustrates time-axis distribution diagram of both starting time of target base station's downlink pilot time slot and starting time of mobile terminal's up link pilot time slot after a period of N×5 ms(T) in a TD-SCDMA system, for example.
Figure 5B:
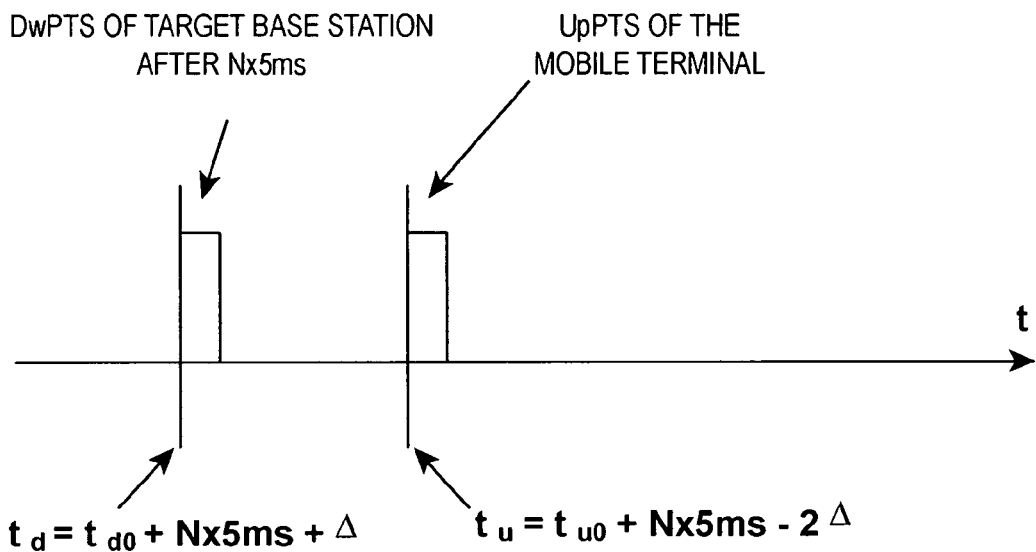

With reference to FIG. 5, after the foregoing process, as is shown in FIG. 5A, when the synchronization is established, the mobile terminal records the starting time $t_{d0}$ of the downlink pilot timeslot (DwPTS) of the handover target base station and the starting time $t_{u0}$ of the mobile terminal's uplink pilot timeslot (UpPTS);

before receiving the handover command, besides maintaining normal communication with the base station 1, the mobile terminal also continues to measure signals of adjacent cells, for instance, after N×5 ms, according to the change of received starting time $t_d$ of the candidate target base station's downlink pilot timeslot (DwPTS), namely $t_d = t_{d0} + N \times 5$ ms$+\Delta$ (wherein, N is the passed sub-frame number, 5 ms (T) is length of each sub-frame, $\Delta$ is the needed compensatory time variation (illustrated as total time variation divided by sub-frame length T is N, and quotient thereof is $\Delta$, where total time variation means difference between original synchronous signal time and current synchronous signal time), and $\Delta$ is the variation value when timing is less than 5 ms, when timing is exactly 5 ms, $\Delta = 0$), changing of starting time $t_u$ of uplink pilot timeslot (UpPTS) of the mobile terminal is determined. When variation $\Delta$ is measured, changing of starting time $t_u$ of uplink pilot timeslot (UpPTS) of the mobile terminal can be acquired with requirement of maintaining synchronization, and this new starting time $t_u = t_{u0} + N \times 5$ ms$-2\Delta$ (including a $\Delta$ delayed by downlink pilot timeslot and another $\Delta$ delayed by the uplink pilot timeslot witch is about to take place), as is shown in FIG. 5B. The above mentioned open-loop synchronization technology is specially designed for the invention, and is a technology not adopted in any current mobile communication system.

Since a TD-SCDMA system is a time division duplex, transmission conditions of uplink and downlink are the same, precision of this open-loop or closed-loop is quite accurate. The above-mentioned measuring procedure will be performed more than once, and variation value $\Delta$ used for timing modification will also be updated in time.

In FIGS. 2 and 3, when receiving handover command (3) from the network, the mobile terminal is synchronized with the handover target base station (the base station 2), and can communicate with the handover target base station (the base station 2) using the time slot and code channel allocated by system, without the need of a synchronization establishment procedure, so that service data are not to be interrupted.

Although soft handover and hard handover are different in the precedence order of new link establishment and original link release, in terms of adopting pre-synchronization technical scheme part in handover as is mentioned in the invention, it is totally the same for soft handover and hard handover. The scheme of the invention is applicable for the situation that base stations are synchronous or synchronization deviation is fixed and known, and also applicable for system without establishing synchronization.

The pre-synchronization technology of the invention can be applied in handover technologies like soft handover, hard handover, and baton handover.

The invention claimed is:

1. A handover method in mobile communication system, comprising the step of:
   A) before handover, measuring signals of adjacent cells by a mobile terminal while maintaining communication between a certain handover-forward base station and the mobile terminal, and confirming candidate handover target base stations to be switched to by the mobile terminal;
   B) sending a measurement report of the handover target base stations satisfying a handover decision criterion to the network by the mobile terminal;
   C) sending a handover command to the mobile terminal by the network when the network determining to the perform handover according to the handover decision criterion;
   D) handover directly to the handover target base station according to the handover command by the mobile terminal;
   E) releasing the communications link between the mobile terminal and the handover-forward base station; and,
   between Steps B and C, further carrying out a pre-synchronization procedure between the mobile terminal and the handover target base station, comprising the steps of:
   sending a training sequence to the handover target base station by the mobile terminal while the mobile terminal is sending the measurement report to network, after the handover target base station receives the training sequence, returning a training sequence response message to the mobile terminal by the handover target base station; and maintaining open-loop or closed-loop uplink synchronization between the mobile terminal and the handover target base station.

2. The method of claim 1, wherein the training sequence response message comprises synchronization information and power adjustment information.

3. The method of claim 1, comprising, in Step A, the mobile terminal performing the measuring by receiving and detecting downlink pilot frequencies of adjacent cells, maintaining the downlink signal synchronization with each candidate handover target base station, and establishing downlink synchronization with each candidate handover target base station in open-loop mode.

4. The method of claim 1, comprising directly sending the training sequence response message to the mobile terminal in signaling mode by the handover target base station.

5. The method of claim 4, wherein the training sequence response message comprises synchronization information and power adjustment information.

6. The method of claim 1, comprising first sending the training sequence response message to the network in signaling mode by the handover target base station, and then sending the message to the handover-forward base station in signaling mode by the network, and finally sending said message to the mobile terminal in signaling mode by the handover-forward base station.

7. The method of claim 6, wherein the training sequence response message comprises synchronization information and power adjustment information.

8. The method of claim 1, wherein the pre-synchronization procedure between the mobile terminal and the handover target base station further comprises the steps of:
   sending an uplink pilot frequency code to the handover target base station during a pilot timeslot by the mobile terminal with the training sequence and adopting estimated transmission timer and transmission power, and establishing uplink synchronization with the handover target base station in open-loop mode by the mobile terminal;
   sending the command of timing adjustment and/or power adjustment concerning the mobile terminal to the mobile terminal by the handover target base station using the training sequence response message and according to the received uplink pilot frequency code, amending the timing and/or transmission power concerning the handover target base station according to the command by the mobile terminal, and then establishing uplink synchronization with the handover target base station in closed-loop mode by the mobile terminal.

9. The method of claim 1, further comprising
   the mobile terminal recording the starting time $t_{d0}$ of downlink pilot timeslot of the handover target base station and the starting time $t_{u0}$ of the mobile terminal's own uplink pilot timeslot when establishing synchronization; the mobile terminal repeatedly executing steps A and B, according to the received change of starting time $t_{d0}$ of downlink pilot timeslot of the handover target base station, the mobile terminal determining the change of starting time $t_{u0}$ of the mobile terminal's uplink pilot timeslot, until the mobile terminal receives handover command, $t_d = t_{d0} + N \times T + \Delta$, $t_u = t_{u0} + N \times T - 2\Delta$, wherein N is the passed sub-frame number, T is length of each sub-frame, and $\Delta$ is the needed compensatory time variation, namely the variation when less than T.

10. The method of claim 1, comprising in Step E, directly sending the release information of wireless link between the mobile terminal and the handover-forward base station to the handover-forward base station by the mobile terminal.

11. The method of claim 1, comprising in Step E, sending the release information of wireless link between the mobile terminal and the handover-forward base station to the network by the handover target base station first, and then to the handover-forward base station by the network.

* * * * *